United States Patent [19]

Adshead et al.

[11] Patent Number: 4,676,562

[45] Date of Patent: Jun. 30, 1987

[54] ELECTRICAL CONNECTOR

[75] Inventors: Leslie T. Adshead; Fred Torr, both of Truro, England

[73] Assignee: Skaigh Engineering Ltd., Devon, England

[21] Appl. No.: 747,410

[22] Filed: Jun. 21, 1985

[30] Foreign Application Priority Data

Jun. 21, 1984 [GB] United Kingdom ............... 8415930
May 13, 1985 [GB] United Kingdom ............... 8512091

[51] Int. Cl.$^4$ ........................................... H01R 11/30
[52] U.S. Cl. .................................................. 439/38
[58] Field of Search ............... 339/12 R, 12 G, 12 L, 339/12 V

[56] References Cited

U.S. PATENT DOCUMENTS

| | | | |
|---|---|---|---|
| 3,324,572 | 6/1967 | Robarge | 339/12 R |
| 3,808,577 | 4/1974 | Mathauser | 339/12 R |
| 4,058,357 | 11/1977 | Wallace | 339/12 R |
| 4,112,941 | 9/1978 | Larimore | 339/12 R |

Primary Examiner—John McQuade
Attorney, Agent, or Firm—Gifford, Groh, VenOphem, Sheridan, Sprinkle and Dolgorukov

[57] ABSTRACT

An electrical connector for use in arc welding comprises a magnet of generally toroidal shape housed in a cup-shaped support and secured by a screw to a casing having a surrounding annular face substantially coplanar with the end face of the magnet and the rim of the cup-shaped support. The magnet is made from a material incorporating a high proportion of cobalt having a low temperature coefficient, which is resistant to high temperatures and substantially unaffected by the high welding current which flows therethrough in operation.

12 Claims, 4 Drawing Figures

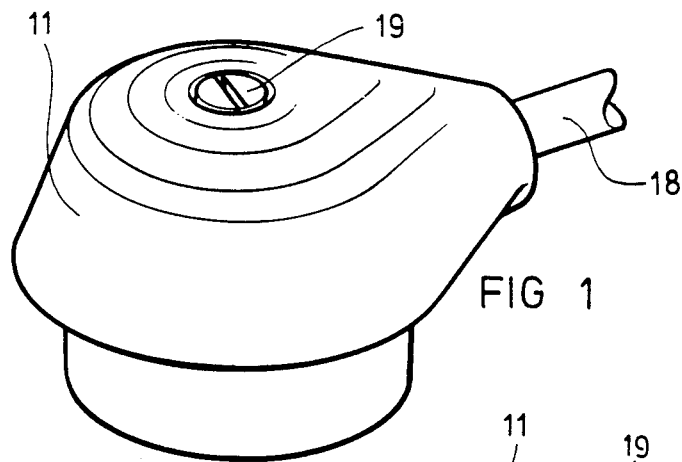
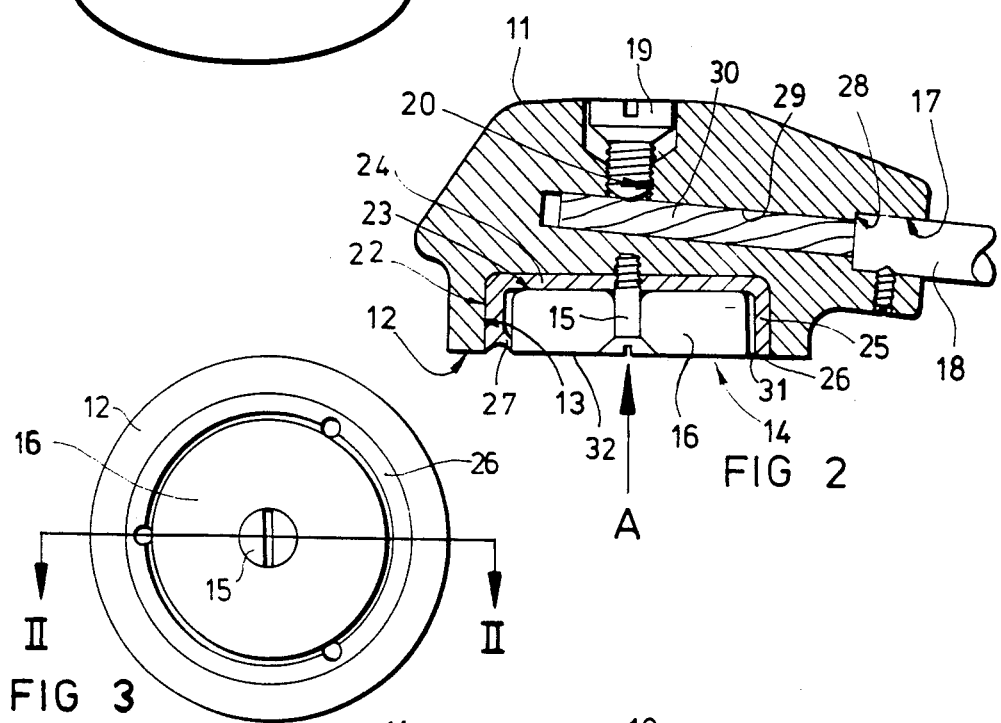
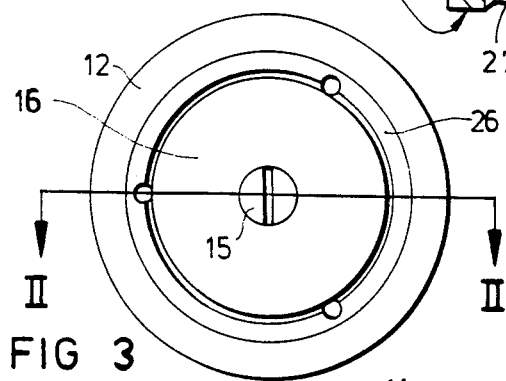
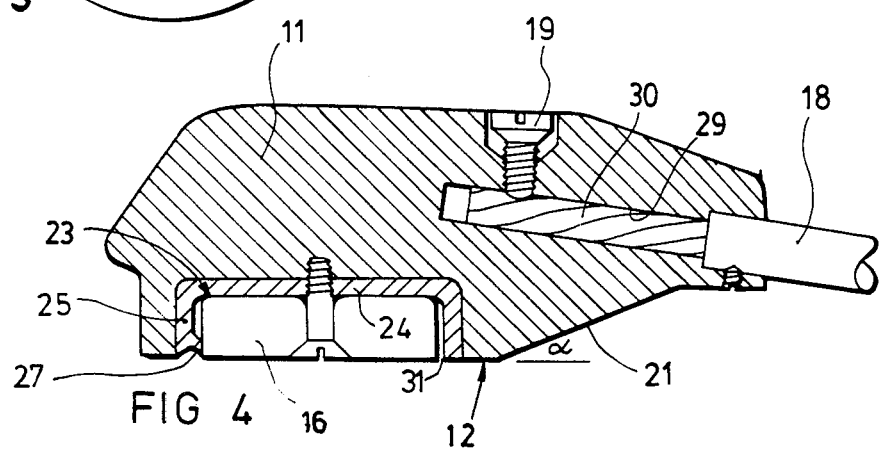

ELECTRICAL CONNECTOR

BACKGROUND OF THE INVENTION

The present invention relates generally to an electrical connector, and particularly to an electrical connector for making a temporary connection between a cable and an electrically conductive article or component.

There are many circumstances where a temporary electrical connection may be required, and such connections are usually made by means of spring loaded clips which act to retain the electrically connected components by resilient mechanical action. Such clips require there to be available an edge or narrow part of the component or article to which the clip is connected since the jaw has a limited width. For use on components having extensive flat surfaces such connectors are inconvenient since they require excessively long connecting cables to reach the nearest adjacent edge.

A requirement for such temporary connection arises particularly when using electric arc welding techniques, but other occasions also arise when temporary electrical connections are required and could be effected using the techniques of the present invention. However, the present invention will be described with particular reference to its application to welding technology although no loss of generality is intended to be occasioned thereby.

OBJECT OF THE INVENTION

The object of the invention is to provide an electrical connector having a magnet by which the electrical and mechanical connection may be made, and which will not be damaged by arcing or high current such as occur during electric arc welding.

SUMMARY OF THE INVENTION

An electrical connector for making a temporary electrical connection between a cable and an electrically conductive ferromagnetic surface is characterised in that it comprises a magnet housed in an electrically conductive casing which is electrically connected to the said cable, the magnet and/or the casing having an exposed face for contact with the said surface, the magnet being made of a material having a temperature coefficient sufficient to resist demagnetisation and thermal degradation when a high current is passed therethrough.

Preferably, although not exclusively, the magnet is a permanent magnet which may in some embodiments be reinforced with an electromagnet energised by the current flowing through the cable. The permanent magnet may then be used for effecting a preliminary attachment which provides an electrical path through the cable and the component to which the connector is attached. When the current flows in the electromagnet it reinforces the permanent magnet to generate an attractive force securely holding the connector in place. The force applied by the electromagnet may be sufficient, for example, to resist vibration or manual separation of the components.

In a preferred embodiment of the invention the magnet is a so-called "pot" magnet, that is a generally toroidal permanent magnet housed in a cup-shape support or magnet housing having a circular rim and secured in a cavity in the body of the casing by fixing through the bottom wall of the cup leaving the rim thereof and one face of the magnet exposed, and preferably substantially coplanar with the face of the casing in which the magnet is secured. A circular contact face has been found to be particularly suitable for the purpose. The casing is preferably an electrically conductive non-magnetic material such as brass or aluminium or an alloy of one or both these metals, and the magnet may be positioned therein such that the exposed face of the magnet is slightly recessed from the contact face of the casing so that secure electrical contact between the casing and the article to which electrical connection to be made is effected and maintained by the magnetic attraction between the magnet and the article, but electrical contact is made between the body of the casing and the article. For such an arrangement to work satisfactorily, of course, an extremely powerful magnet is required, but it has the advantage that the magnet is not traversed by the electric current, not subject to the direct heating effect thereof and a permanent magnet reinforced by an electromagnet is particularly suitable for such an application.

In the preferred embodiment, however, the magnet is a permanent magent made from a material capable of withstanding high temperatures without losing its magnetisation. Such a material preferably includes a composition comprising cobalt and iron. The proportion of cobalt preferably exceeds 20% and in preferred embodiments of the invention lies between 25% and 35%. One suitable composition capable of resisting the high temperatures involved comprises the following:

| | |
|---|---|
| Cobalt | 29% |
| Nickel | 15% |
| Aluminium | 7% |
| Copper | 4% |
| Titanium | 4% |
| Niobium | 2% |
| Iron | balance. |

It is believed that the temperature resistance of this compound is largely attributable to the cobalt in the composition. Such a magnet may be made by casting, or sintering, or, if other materials such as rare earths are included, the process may comprise sintering and bonding. A typical reversible temperature coefficient of $-0.02\%/°C.$ has been noted with a magnet being the composition set out above.

Another suitable composition for the magnet is one with an even higher proportion of cobalt and no niobium. Such a composition may comprise:

| | |
|---|---|
| Cobalt | 34% |
| Nickel | 15% |
| Aluminium | 7% |
| Copper | 4% |
| Titanium | 5% |
| Iron | Balance |

The force applied by the permanent magnet between itself and a ferromagnetic article, may be sufficiently great to resist direct manual separation. The force applied by a magnet of this type is sometimes referred to as the "pull" of the magnet and such magnets having a "pull" of up to 25 kilogrammes are commercially available.

The dimensions of such magnets having a composition such as that outlined above are such that they can be housed within a casing sufficiently small to be gripped by one hand. Preferably, the casing is shaped so that it fits the shape of the hand and can be gripped firmly, even so such a high force cannot always easily be applied, and, for this reason, a specific embodiment of the invention is provided with a release face inclined at a shallow angle with respect to the contact face in such a way that the line of intersection of the two faces constitutes a fulcrum about which the casing can be rocked in effecting release of the magnet from the component. Moreover, for special purposes, such as attachment of the connector to spherical or cylindrical surfaces, contact faces having correspondingly shaped spherical or cylindrical forms may be provided.

Other features and advantages of the invention will become apparent from a study of the following detailed description of preferred embodimengs, in which reference is made to the accompanying drawings, provided purely by way of non limitative example.

BRIEF DESCRIPTION OF THE DRAWINGS

FIG. 1 is a perspective view of a releasable electrical connector formed as a first embodiment of the present invention;

FIG. 2 is a sectional side view of a connector illustrated in FIG. 1 taken on the line II—II of FIG. 3;

FIG. 3 is a view in the direction of Arrow A of FIG. 2; and

FIG. 4 is a sectional view similar to that of FIG. 2, illustrating a second embodiment of the invention.

DESCRIPTION OF THE PREFERRED EMBODIMENTS

Referring first to FIGS. 1 to 3 of the drawings, the connector shown comprises a casing body generally indicated 11 made from brass or cast aluminium or an alloy including one or comprising both of these metals having a flat lower face 12 with a recess 13 housing a shallow so-called pot magnet 14 secured in the casing 11 by a countersunk screw 15. The pot magnet 14 comprises a toroidal permanent magnet body 16 through the central hole in which the screw 15 passes. The toroidal permanent magnet body 16 is fixed in a mild steel cup-shape housing 22 having a circular bottom wall 24, a cylindrical side wall 25 and a circular rim 26. The toroidal magnet body 16 is secured in place in the housing 22 with its inner end face 23 in contact with the bottom wall 24 of the housing 22 and an air gap 31 between the cylindrical side wall 25 of the housing 22, and the permanent magnet body 16 by means of three punchings 27 which deform the rim 26 of the cup-shape housing 22 radially inwardly at three points to contact the magnet body and hold it firmly in place. The outer end face 32 of the magnet body is ground flat and substantially flush with both the rim 26 of the cup-shape magnet housing and the contact face 12 of the connector casing.

The casing 11 also has a bore 17 for receiving an electrical cable 18. The bore 17 has a shoulder 28 and a narrower portion 29 for receiving the inner core 30 of the cable 17, which can be clamped in place by a clamping screw 19 passing through a threaded opening 20 in the upper face of the casing.

The material of the magnet body 16 comprises the following constituents:

| Cobalt | 29% |
| Nickel | 15% |
| Aluminium | 7% |
| Copper | 4% |
| Titanium | 4% |
| Niobium | 2% |
| Iron | Balance |

Magnets with this constitution are commercially available, for example from Swift Levick Magnets Ltd., of Sheffield, and are sold under the trade name HYCOMAX 2. By positioning a toroidal magnet body 16 in a cup-shape casing 22 with the peripheral air gap 31 the magnetic flux path is directed through the casing skirt or cylindrical wall 25 to the rim 26 thereby greatly increasing the strength of the magnet for a given size and making the connector of the present invention a practical possibility at reasonable size.

The connector described above is particularly suitable for use as an earth connector for electric arc welding because the magnet 16 and housing 22 together with the casing 11 provide a good electrical connection and the magnet 16 can resist not only the high temperatures involved, but also the arcing which inevitably occurs due to imperfect face-to-face contact with a rough workpiece, without demagnetisation or substantial physical degradation of the contact face.

The cable 18 is constituted by the normal earthing cable provided for arc welding purposes, which according to conventional welding techniques would otherwise be provided with a crocodile clip. When welding flat panels or extensive surfaces, however, crocodile clips have the disadvantage that they can only be attached to an edge and the earth connector terminal of the present invention offers the significant advantage that it can be positioned easily anywhere over the surface being welded to provide an easily made and secure electrical connection. A large part of the electric current passes through the casing and not the magnet if the rim 26 is accurately coplanar with the face 12 of the casing 11.

In the alternative embodiment (illustrated in FIG. 4) the magnet material is as follows:

| Cobalt | 34% |
| Nickel | 15% |
| Aluminium | 7% |
| Copper | 4% |
| Titanium | 5% |
| Iron | Balance. |

Such magnets may be obtained commercially from Swift Levick Magnets Ltd., of Sheffield under the trade name HYCOMAX 3. These magnets have a higher energy product that the hycomax 2 magnets and for much the same dimensions can provide a significantly greater attractive force. In this embodiment the flat face 12 of the casing 11 is supplemented by an additional face 21 at a shallow angle α with respect thereto and the casing 11 projects over this face enabling it to be rocked about a fulcrum constituted by the line of intersection of the two planes.

The present invention also comprehends a method of electric arc welding in which the earthing connection is made by magnetically retaining a contact face of a connector to a workpiece, the connector and the magnet having electrically conductive properties and a temperature coefficient such as to enable sufficient current to pass for welding, whislt having a low contact resistance with the metal being welded.

What is claimed is:

1. An electrical connector for making a temporary electrical connection between a cable and an electrically conductive ferromagnetic surface, comprising:
   a magnet,
   an electrically conductive casing for said magnet,
   a cup-shape housing for said magnet, said cup-shape housing having a rim,
   radially inwardly directed projections extending inwardly from said rim,
   said magnet being secured to said cup-shape housing by contact between said radially inwardly directed projections of said rim of said housing and said magnet, leaving an air gap between the periphery of said magnet and said rim of said cup-shape housing,
   electrical connection means electrically connecting said cable and said casing,
   one of said magnet and said casing having an exposed face for contact with said surface,
   said magnet being made of a material having a temperature coefficient sufficient to resist demagnetisation and thermal degradation when a welding current is passed therethrough.

2. The electrical connector of claim 1, wherein said magnet is a permanent magnet.

3. The electrical connector of claim 1, wherein said magnet has a generally toroidal permanent magnet body and both said magnet body said cup-shape housing are secured to said casing by a mechanical fixing passing through both said magnet body and the bottom of said cup-shape housing leaving said rim of said cup-shape housing and an end face of said magnet body exposed.

4. The electrical connector of claim 1, wherein said casing is composed of brass.

5. The electrical connector of claim 1, wherein said magnet has a percentage of cobalt exceeding 20%.

6. The electrical connector of claim 1, wherein said magnet has a proportion of cobalt between 25% and 35%.

7. The electrical connector of claim 1, wherein said magnet includes the following components by weight:

| | |
|---|---|
| Cobalt | between 25% and 35% |
| Nickel | between 10% and 20% |
| Aluminium | between 5% and 10. |
| Copper | up to 5% |
| Titanium | up to 5% |
| Niobium | between 1% and 3% |

8. The electrical connector of claim 1, wherein said casing is composed of aluminium.

9. The electrical connector of claim 1, wherein said casing is composed of an alloy of aluminium.

10. The electrical connector of claim 1, wherein said casing is composed of an alloy of brass.

11. The electrical connector of claim 1, wherein said radially inwardly directed projections are formed by deformation of said rim of said housing by punching thereof.

12. The electrical connector of claim 1, wherein both said magnet and said casing having exposed faces substantially co-planar with one another and said casing has a further face contiguous with said exposed face of said casing, said contiguous face of said casing meeting said exposed face of said casing and lying at an acute angle with respect thereto.

* * * * *